May 19, 1970   J. L. JUHL   3,512,276
NURSERY TREE DIGGER
Filed March 20, 1967   2 Sheets-Sheet 1
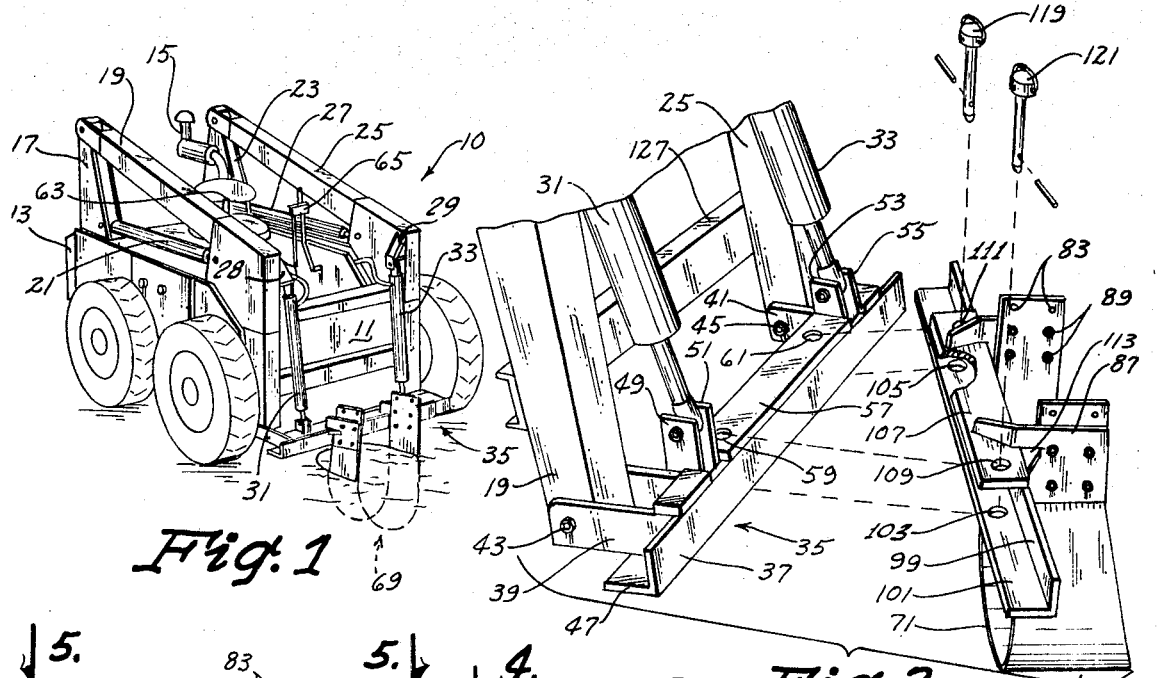
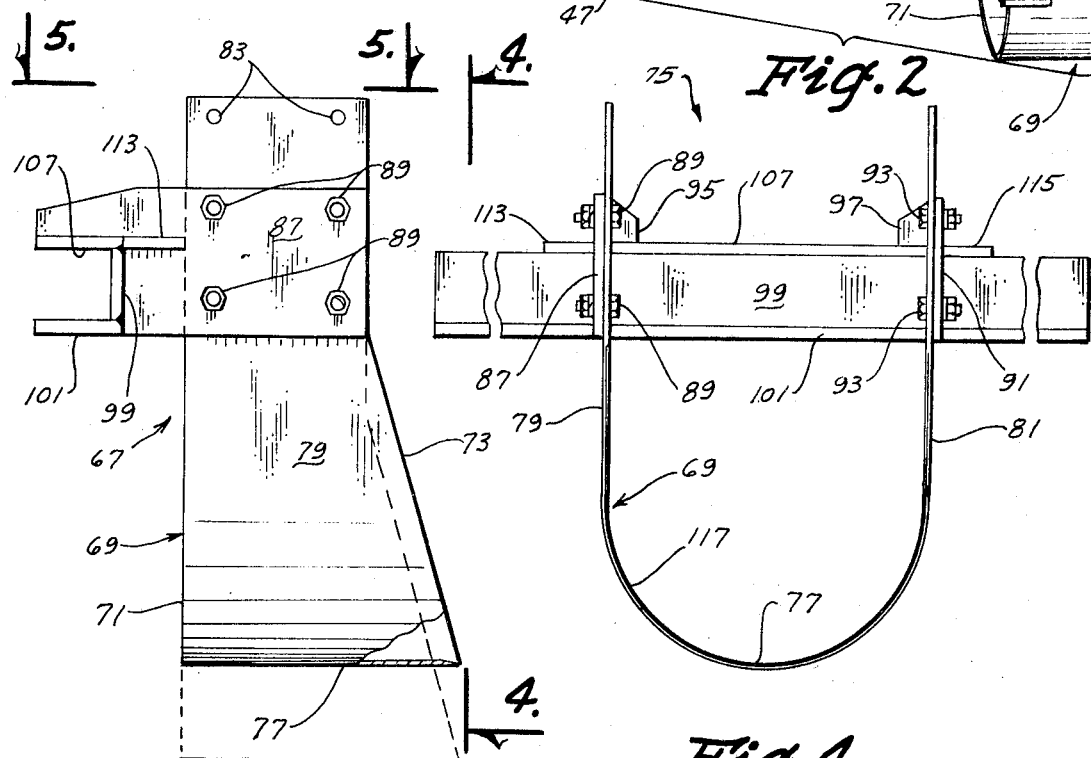
INVENTOR
JAMES L. JUHL
BY
Zarley, McKee & Thomte
ATTORNEYS May 19, 1970   J. L. JUHL   3,512,276
NURSERY TREE DIGGER
Filed March 20, 1967   2 Sheets-Sheet 2

INVENTOR
JAMES L. JUHL
BY
Deck, Zarley, McKee & Thomte
ATTORNEYS

United States Patent Office 3,512,276
Patented May 19, 1970

1

3,512,276
NURSERY TREE DIGGER
James L. Juhl, Hudson, Iowa, assignor, by mesne assignments, to J. I. Case Company, Racine, Wis., a corporation of Wisconsin
Filed Mar. 20, 1967, Ser. No. 624,288
Int. Cl. A01g 23/06
U.S. Cl. 37—2                                4 Claims

ABSTRACT OF THE DISCLOSURE

A nursery tree digger for a self-propelled loader having a pair of lifting arm members pivotally secured thereto at one of their ends and a substantially U-shaped blade operatively pivotally secured to the other ends of arm members.

---

It is obviously necessary for the operator of tree nurseries to remove the nursery trees from the ground at some time during the growth thereof. Presently, the trees are manually removed from the ground and great care must be take so that the majority of the root system and dirt surrounding the same is removed with the tree itself. Obviously, such an operation is tedious and time consuming.

Therefore, it is a principal object of this invention to provide a nursery tree digger for a self-propelled loader.

A further object of this invention is to provide a nursery tree digger which insures that the majority of the root system and the dirt surrounding the same will be removed with the tree itself.

A further object of this invention is to provide a nursery tree digger which permits the rapid transplanting of nursery trees.

A further object of this invention is to provide a nursery tree digger which not only digs the tree from the ground but also provides a means for supporting the same during the removal of the tree from the ground.

A further object of this invention is to provide a nursery tree digger which is economical of manufacture, durable in use and refined in appearance.

These and other objects will be apparent to those skilled in the art.

This invention consists in the construction, arrangements, and combination of the various parts of the device, whereby the objects contemplated are attained as hereinafter more fully set forth, specifically pointed out in the claims, and illustrated in the accompanying drawings in which:

FIG. 1 is a front perspective view of a self-propelled loader having the nursery tree digger detachably connected to the forward ends of the loader lifting arms;

FIG. 2 is a fragmentary exploded perspective view of the digger and the forward ends of the lifting arms and the structure associated therewith;

FIG. 3 is a side view of the nursery tree digger;

FIG. 4 is a front view of the nursery tree digger;

FIG. 8 is a side view illustrating the relationship of the

Figure 5:
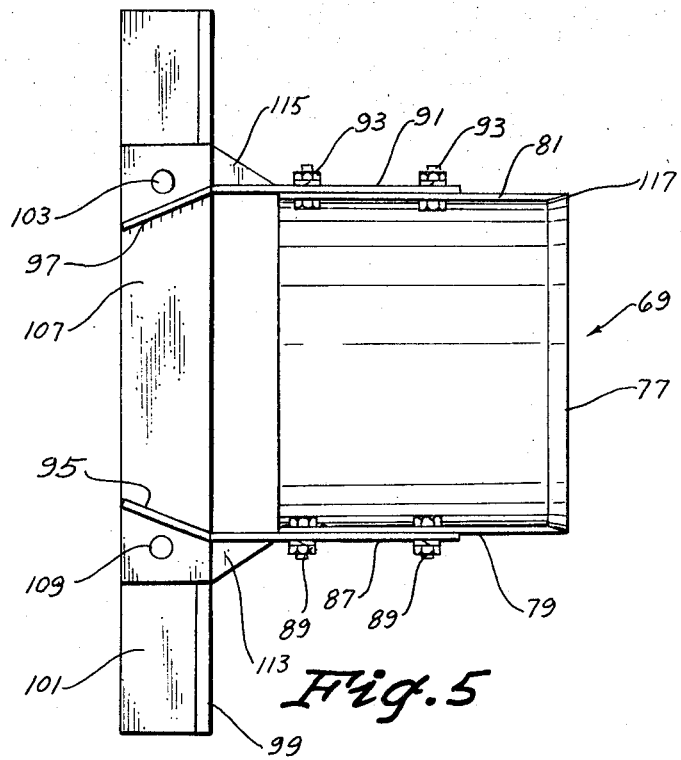
FIG. 5 is a top view of the nursery tree digger.

2 loader, digger and the tree to be removed after the tree has been removed from the ground.

The numeral 10 generally designates a self-propelled loader of the type which is manufatured by Universal Manufacturing Company, Hudson, Iowa and is known in the trade as a Uni-Loader. Loader 10 includes a front end 11, rear end 13 and is powered by conventional power means 15. Loader 10 is provided with a pair of driving wheels at each side thereof and each pair of driving wheels may be selectively rotated in a forwardly or rearwardly direction to propel and steer the loader.

Secured to the upward rearward end of loader 10 adjacent one side thereof is a boom upright 17 having a boom 19 pivotally secured thereto and which extends forwardly therefrom as viewed in FIG. 1. A hydraulic lift cylinder 21 is pivotally connected at its base end to the lower forward end of upright 17 and at its other end to boom 19 as seen in the drawings. Secured to the upward rearward end of loader 10 adjacent its other side is a boom upright 23 having a boom 25 pivotally secured thereto and which extends forwardly therefrom. A hydraulic lift cylinder 27 is pivotally connected at its base end to the lower forward end of upright 23 and at its other end to boom 25 as seen in the drawings. Brackets 28 and 29 are secured to booms 19 and 25 respectively and have tilt cylinders 31 and 33 pivotally secured thereto respectively. The forward ends of tilt cylinders 31 and 33 are pivotally connected to a cross member means 35 which is pivotally secured to and extends between the forward ends of booms 19 and 25.

Cross member means 35 consists of an elongated angle 37 having a pair of spaced apart ear members 39 secured thereto adjacent one end thereof which extends rearwardly therefrom and a pair of spaced apart ear members 41 secured thereto and extending rearwardly therefrom. The forward end of boom 19 is pivotally secured between the pair of ear members 39 by means of pin 43 and the forward end of boom 25 is pivotally secured between the pair of ear members 41 by means of pin 45. Secured to the horizontal portion 47 of angle 37 adjacent the pair of ear members 39 are a pair of spaced apart ear members 49 and 51 which extend upwardly therefrom and which pivotally receive therebetween the forward end of tilt cylinder 21. A pair of spaced apart ear members 53 and 55 are also secured to the horizontal portion 47 of angle 37 adjacent the pair of ear members 41 and extend upwardly therefrom and pivotally receive therebetween the forward end of tilt cylinder 33. A horizontal reinforcing plate 57 is secured to the upper end of angle 37 and extends rearwardly therefrom and has a pair of openings 59 and 61 formed therein. Horizontal portion 47 of angle 37 is also provided with a pair of openings formed therein which register with openings 59 and 61 respectively. It can therefore be seen that the operation of the tilt cylinders 31 and 33 will cause the cross member means 35 to be pivoted with respect to the booms 19 and 25.

The numeral 63 generally designates a control lever which is operatively connected to the pair of wheels at one side of the loader and which is adapted to control the direction of rotation of this pair of wheels. Control lever 63 is also operatively connected to the loader hydraulic system and the tilt cylinders 31 and 33 to control the operation of the same. The numeral 65 is operatively connected to the pair of wheels at the other side of the loader to control the direction of rotation thereof. Control lever 65 is also operatively connected to the loader hydraulic system and to the cylinders 21 and 27 to control the movement of the booms 19 and 25.

The nursery tree digger is generally designated by the reference numeral 67 and is adapted to be secured to the cross member means 35. The numeral 69 generally designates a substantially U-shaped blade having a rearward end 71, forward end 73, open upper end 75 and a bottom portion 77. As seen in FIG. 4, blade 69 includes opposite sides 79 and 81 which extend parallel from bottom portion 77.

Blade 69 is provided with a plurality of bolt openings 83 formed in side 79 and a plurality of bolt openings 85 formed in side 81 which register with the openings in side 79. Plate 87 is secured to side 79 by bolts 89 extending through four openings 83 and side 79 through plate 87 (FIGS. 3–5). Plate 91 is secured to side 81 by bolts 93 extending through four openings 85 in side 81 and through plate 91 (FIGS. 4 and 5). The lower rearward ends of plates 87 and 91 are cut away thereby defining ledge portions 95 and 97 on plates 87 and 91 respectively which extend inwardly and rearwardly with respect to blade 69 as best seen in FIGS. 4 and 5. A flat bar member 99 is welded to the vertical wall portions formed by the cut away areas in plates 87 and 91 and as seen in FIG. 4 bar member 99 extends outwardly of sides 79 and 81. A bar member 101 is welded to the lower end of bar member 99 and extends transversely rearwardly therefrom. Bar members 99 and 101 are of equal length and bar member 101 is provided with a pair of spaced apart openings 103 and 105 formed therein. A bar member 107 is welded to ledge portions 95 and 97 and extends rearwardly therefrom parallel to bar member 101. Bar member 107 is provided with a pair of openings 109 and 111 formed therein which register with openings 103 and 105 in bar member 101. As seen in FIG. 4, bar member 107 extends laterally of sides 79 and 81 but has a length shorter than that of bar members 99 and 101.

A gusset plate 113 is welded to bar member 107 and plate 87 and a gusset plate 115 is welded to bar member 107 and plate 91 as illustrated in the drawings. As seen in FIG. 3, the forward end of blade 79 is tapered so that the width of bottom 77 is greater than the width of sides 79 or 81 adjacent their upper ends. The forward end of blade 77 is beveled as best illustrated in FIG. 4 to provide a sharp cutting edge 117.

The digger 67 is connected to the cross member means 35 as illustrated in the exploded perspective view of FIG. 2. The attachment of digger 67 to the cross member means 35 is effected by simply causing angle 37 and plate 57 to be received between bar members 101 and 107 so that the openings 103 and 109 are in alignment with opening 59 and the registering opening formed in horizontal portion 47 of angle 37 and the openings 105 and 111 are in alignment with opening 61 and the registering opening formed in horizontal portion 47 of angle 37. Pin members 119 and 121 are then inserted through the registering openings in conventional fashion to maintain the digger on the cross member means 35. As seen in FIGS. 1 and 2, bar member 107 is received between ear members 51 and 53 and bar members 99 and 101 extend to the ends of angle 37.

Figure 6:
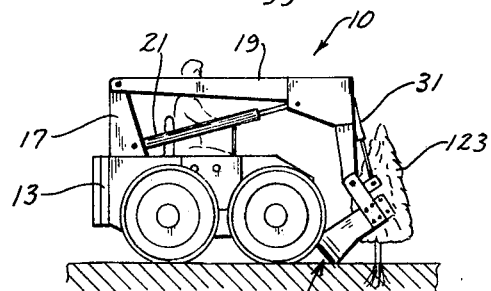
FIG. 6 is a side view illustrating the relationship of the loader, digger and the tree to be removed prior to the commencement of the digging operation.
Figure 7:
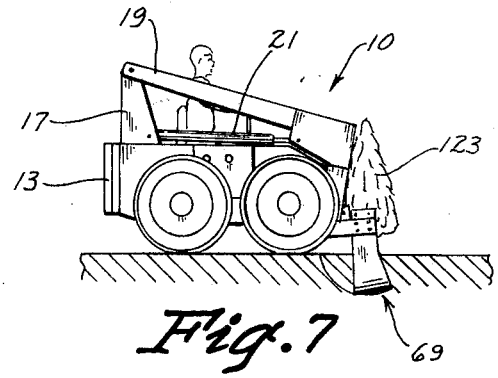
FIG. 7 is a side view illustrating the relationship of the loader, digger and a tree to be removed during the digging operation.
Figure 8:
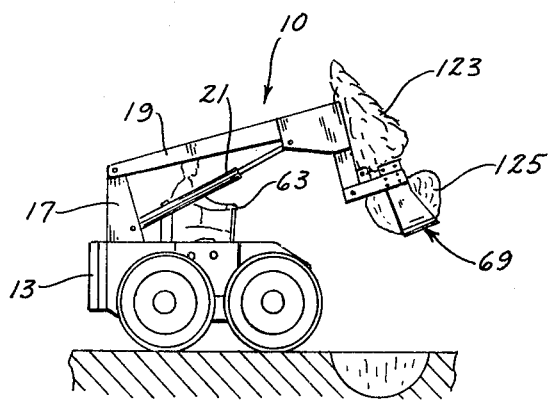

The tree digging operation is illustrated in FIGS. 6, 7 and 8. The operator manipulates the control levers 63 and 65 so that the booms 19 and 25 are slightly elevated from their lowered position and so that tilt cylinders 31 and 33 have pivoted digger 67 to the position illustrated in FIG. 6. It can be seen in FIG. 6 that the lower forward edge of bottom 77 is resting on the ground at a point spaced from the tree 123. FIG. 6 illustrates the relationship of the digger with respect to the tree before the leading edge of the bottom portion 77 of blade 79 enters the ground. The root system is severed from the ground by simply causing tilt cylinders 31 and 33 to pivot cross member means 35 and hence digger 67 from the position illustrated in FIG. 6 to the position illustrated in FIG. 7 while at the same time lowering the booms 19 and 25. In the position of FIG. 7, the U-shaped blade 69 has entered the ground and severed a large majority of the root system from the ground and the bottom portion 77 is substantially below the trunk of the tree. The tree is then lifted from the ground as illustrated in FIG. 6 by causing booms 19 and 25 to be raised with respect to the loader. As illustrated in FIG. 8, the tree 123 and its root system which is contained in the ball of earth 125 are supported on bottom portion 77 of blade 69 between sides 79 and 81. The tree 123 is prevented from tipping rearwardly with respect to the loader by the engagement of the tree with a cross member 127 extending between booms 19 and 25. It can be appreciated that the raising of booms 19 and 25 from the position of FIG. 7 to the position of FIG. 8 will cause blade 69 to sever the large majority of the root system from the ground and also cause the ball of dirt 125 to be removed simultaneously with the tree 123. The tree 123 is then moved to any convenient location by means of the self-propelled loader 10 and is deposited on the supporting surface by simply lowering the booms 19 and 25 so that the bottom portion 77 of blade 69 engages the supporting surface. The digger 67 is then pivoted rearwardly with respect to the booms 19 and 25 thereby causing the tree 123 and its ball of dirt 125 to be removed from the digger 67.

The depth to which blade 69 penetrates can be varied through the manipulation of the booms 19 and 25 together with the pivotal movement of the digger 67 and can also be varied by simply removing bolts 89 and 93 to permit the blade 79 to be moved upwardly or downwardly with respect to the plates 87 and 91. The bolts 89 and 93 would then again be reinserted through the plates 87 and 91 and the blade 79. It can be seen that a unique nursery tree digger has been provided which may be attached to a self-propelled loader to quickly and efficiently remove nursery trees from the ground. The digger described herein insures that a large majority of the root system will be removed from the ground with the tree and also insures that a certain amount of dirt will be left on the root system to prevent damage thereto during the subsequent storage or shipment operation. The digger is quickly and easily attached to the loader by means of the pins 119 and 121 to permit the loader to be used for various other purposes. It should be noted that the digger 67 is pivotally movable approximately 110 degrees with respect to the booms from an initial digging position to a transport position. This range of pivotal movement insures convenient and efficient operation of the apparatus.

Thus from the foregoing it can be seen that the device accomplishes at least all of its stated objectives.

I claim:
1. In combination,
a wheeled frame means,
a boom means pivotally secured at one end thereof to said frame means,
first power means for moving said boom means with respect to said frame means,
a U-shaped blade means operatively pivotally secured to said boom means at the other end thereof,
and second power means for pivotally moving said blade means with respect to said boom means,
said boom means including a pair of spaced apart boom arms pivotally secured at one end thereof to said frame means,
a cross member means pivotally secured to and extending between the other ends of said boom arms, said blade means including a U-shaped blade member having spaced apart first and second sides, said sides having upper and lower ends and being interconnected at their lower ends by an arcuate bottom portion, a first plate secured to said first side adjacent the upper end thereof, a second plate secured to said second side adjacent the upper end thereof, and a channel means secured to said first and second plates adapted to be secured to said cross member means.

2. The combination of claim 1 wherein said blade member is vertically adjustably secured at its sides to said first and second plates.

3. The combination of claim 1 wherein said blade member has a tapered portion at its forward end so that the forward end of said bottom portion projects forwardly of the upper end of said blade member.

4. The combination of claim 1 wherein each of boom arms includes a rear boom arm portion and a front boom arm portion, said front boom arm portion extending downwardly from the forward end of said rear boom portion, said cross member being pivotally secured to and extending between the free ends of said front boom arm portions, a second cross member secured to and extending between said front boom arm portions above said cross member, said boom means and said cross member adapted to cause said blade means to dig trees from the ground, said blade means adapted to support a tree thereon for transportation thereof, said second cross member being in the pivotal path of said tree to limit the rearward tipping of said tree.

References Cited

UNITED STATES PATENTS

| | | | |
|---|---|---|---|
| 2,646,740 | 7/1953 | Luoma | 172—277 |
| 2,952,322 | 9/1960 | Jurcheck | 172—698 |
| 3,160,215 | 12/1964 | Harrell | 172—698 |
| 2,652,639 | 9/1953 | Kluckhohn | 37—2 |
| 2,703,044 | 3/1955 | Adair | 37—2 |
| 2,732,637 | 1/1956 | Shadden | 37—2 |
| 3,259,258 | 7/1966 | Fisher | 214—130 |

ROBERT E. PULFREY, Primary Examiner

E. H. EICKHOLT, Assistant Examiner

U.S. Cl. X.R.

172—698